(12) United States Patent
Ikemoto et al.

(10) Patent No.: US 9,161,160 B2
(45) Date of Patent: Oct. 13, 2015

(54) WIRELESS COMMUNICATION SYSTEM

(71) Applicant: Murata Manufacturing Co., Ltd., Nagaokakyo-shi, Kyoto-fu (JP)

(72) Inventors: Nobuo Ikemoto, Nagaokakyo (JP); Satoshi Ishino, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 236 days.

(21) Appl. No.: 13/908,139

(22) Filed: Jun. 3, 2013

(65) Prior Publication Data

US 2013/0260803 A1    Oct. 3, 2013

Related U.S. Application Data

(63) Continuation of application No. PCT/JP2012/052335, filed on Feb. 2, 2012.

(51) Int. Cl.
*H04W 4/00* (2009.01)
*H04B 5/00* (2006.01)

(52) U.S. Cl.
CPC ............ *H04W 4/008* (2013.01); *H04B 5/0031* (2013.01); *H04B 5/0012* (2013.01); *H04B 5/0075* (2013.01)

(58) Field of Classification Search
CPC .................................................... H04W 4/008
See application file for complete search history.

(56) References Cited

U.S. PATENT DOCUMENTS

| | | | |
|---|---|---|---|
| 5,991,599 A | 11/1999 | Uchikawa | |
| 6,026,303 A | 2/2000 | Minamisawa | |
| 6,901,275 B1 | 5/2005 | Aoyagi | |
| 8,644,880 B2 * | 2/2014 | Patrice | 455/556.1 |
| 8,665,069 B2 * | 3/2014 | Weitzhandler et al. | 340/10.1 |
| 8,878,674 B2 * | 11/2014 | Claessen | 340/572.1 |
| 8,922,346 B2 * | 12/2014 | White | 340/10.1 |
| 2006/0192007 A1 | 8/2006 | Ide | |
| 2006/0208899 A1 | 9/2006 | Suzuki et al. | |

(Continued)

FOREIGN PATENT DOCUMENTS

GB    2 394 526 B    5/2006
JP    08-265250 A    10/1996

(Continued)

OTHER PUBLICATIONS

Official Communication issued in International Patent Application No. PCT/JP2012/052335, mailed on Apr. 24, 2012.

(Continued)

*Primary Examiner* — Bobbak Safaipour
(74) *Attorney, Agent, or Firm* — Keating & Bennett, LLP (57) ABSTRACT

A wireless communication system includes a plurality of communication devices, and a communication terminal that is a separate structure from the plurality of communication devices. Each of the communication devices includes a coupling portion to be coupled with the communication terminal, a power source, and a signal processing section arranged to process a signal received and a signal to be sent. The communication terminal includes neither a power source nor a signal processing section, and the communication terminal includes a coupling portion to be coupled with the coupling portion of each of the communication devices, an antenna arranged to send and receive radio waves, and a connector arranged to connect the coupling portion and the antenna to each other.

20 Claims, 5 Drawing Sheets

(56) References Cited

U.S. PATENT DOCUMENTS

| | | |
|---|---|---|
| 2006/0243811 A1 | 11/2006 | Koyama et al. |
| 2007/0164912 A1 | 7/2007 | Yanagi et al. |
| 2009/0009330 A1 | 1/2009 | Sakama et al. |
| 2012/0182128 A1 | 7/2012 | Ikemoto |

FOREIGN PATENT DOCUMENTS

| | | |
|---|---|---|
| JP | 10-145276 A | 5/1998 |
| JP | 2001-103570 A | 4/2001 |
| JP | 2003-205791 A | 7/2003 |
| JP | 2006-245657 A | 9/2006 |
| JP | 2006-246372 A | 9/2006 |
| JP | 2006-301827 A | 11/2006 |
| JP | 2007-194842 A | 8/2007 |
| JP | 2007-221366 A | 8/2007 |
| JP | 2008-167190 A | 7/2008 |
| JP | 2008-207875 A | 9/2008 |
| JP | 2009-15475 A | 1/2009 |
| JP | 2009-100362 A | 5/2009 |
| JP | 2009-231868 A | 10/2009 |
| JP | 2013-197852 A | 9/2013 |
| WO | 2011/055701 A1 | 5/2011 |

OTHER PUBLICATIONS

Official Communication issued in corresponding Japanese Patent Application No. 2012-555945, mailed on Apr. 30, 2014.

* cited by examiner

WIRELESS COMMUNICATION SYSTEM

BACKGROUND OF THE INVENTION

1. Field of the Invention

The present invention relates to a wireless communication system, and more particularly, to a wireless communication system using devices in compliance with ZigBee (registered trademark), WiFi (registered trademark), and Bluetooth (registered trademark), for example.

2. Description of the Related Art

In a wireless close-range communication system, such as a wireless LAN, there are provided a plurality of terminal devices for a base unit. In such a communication system, an increase in the number of terminal devices may cause problems. As the number of terminal devices increases, the performance of the base unit deteriorates, thereby resulting in worsening of the quality of communication between the base unit and the terminal devices. Also, radio wave interference among the terminal devices may deteriorate the communication quality. In a communication system disclosed in Japanese Patent Laid-Open Publication No. 2001-103570, the functions of the devices as a base unit and as terminal devices are changeable. However, this arrangement cannot solve the problems described above.

SUMMARY OF THE INVENTION

Preferred embodiments of the present invention provide a wireless communication system in which a base unit communicates with a plurality of terminal devices with no fault.

A wireless communication system according to a preferred embodiment of the present invention includes a plurality of communication devices, and a communication terminal that is a separate structure from the plurality of communication devices, wherein each of the communication devices includes a coupling portion arranged to be electrically coupled with the communication terminal, a power source, and a signal processing section that processes a signal received and a signal to be sent. The communication terminal includes a coupling portion arranged to be electrically coupled with the coupling portion of each of the plurality of communication devices, an antenna arranged to send and receive radio waves, and a connector arranged to connect the coupling portion and the antenna to each other. The communication terminal includes neither a power source nor a signal processing section. By coupling the coupling portion of the communication terminal with the coupling portion of a specified one of the plurality of communication devices, the communication terminal receives a signal from the specified one of the plurality of communication devices at the coupling portion and sends the signal through the antenna, and/or receives a signal at the antenna and sends the signal to the specified one of the plurality of communication devices through the coupling portion.

In the wireless communication system, the plurality of communication devices may be terminal devices, and the wireless communication system may further include a base unit that includes a single antenna and that is communicable with one of the communication devices (terminal devices) of which coupling portion is coupled with the coupling portion of the communication terminal through the antenna. All of the communication devices may be terminal devices, and one of the communication devices of which coupling portion is coupled with the coupling portion of the communication terminals may function as a base unit. Alternatively, all of the communication devices may be terminal devices, and two or more communication terminals may be provided so that at least two of the communication devices of which coupling portions are coupled with the coupling portions of the communication terminals are communicable with each other.

In the wireless communication system, only the communication device of which coupling portion is coupled with the coupling portion of the communication terminal is communicable with another communication device a base unit or another communication device of which coupling portion couples with the coupling portion of another communication terminal). In the wireless communication system, which includes a plurality of communication devices, only some of the communication devices that are coupled with the communication terminals are communicable. This never puts too heavy a burden on the base unit, and it does not cause degradation of the communication quality between the base unit and terminal devices. Also, degradation of the communication quality due to radio wave interference between the terminal devices is avoided.

In the wireless communication system according to various preferred embodiments of the present invention, only the communication device of which coupling portion is coupled with the coupling portion of the communication terminal is communicable with another communication device, and therefore, degradation of the communication quality due to too heavy a burden on the base unit and/or due to radio wave interference between the terminal devices is avoided. Thus, communication between the base unit and the terminal devices is ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Wireless communication systems according to preferred embodiments of the present invention will be described with reference to the accompanying drawings. In the drawings, the same members and portions are denoted by the same reference symbols, and the same description will not be repeated.

First Preferred Embodiment

Figure 1:
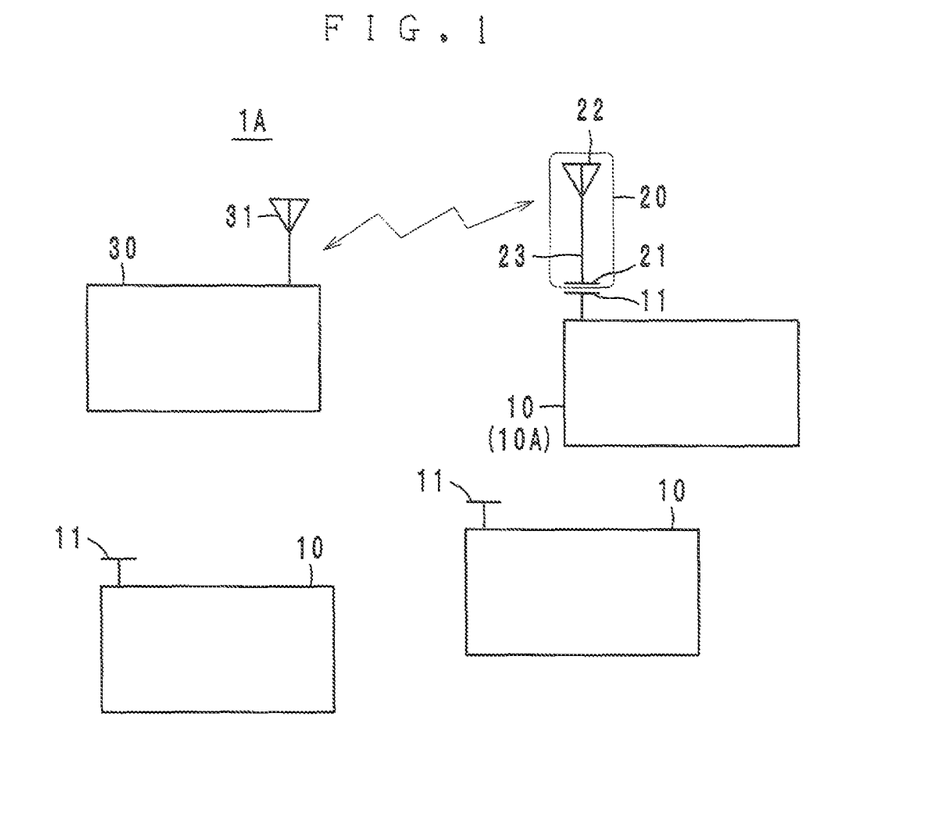
FIG. 1 is a schematic view showing a wireless communication system according to a first preferred embodiment of the present invention.

A wireless communication system 1A according to a first preferred embodiment of the present invention, as shown in FIG. 1, includes a plurality of communication devices (terminal devices) 10, a communication terminal 20 that is a separate body from the communication devices (terminal devices) 10, and a communication device (base unit) 30 including a single antenna 31.

Figure 2:
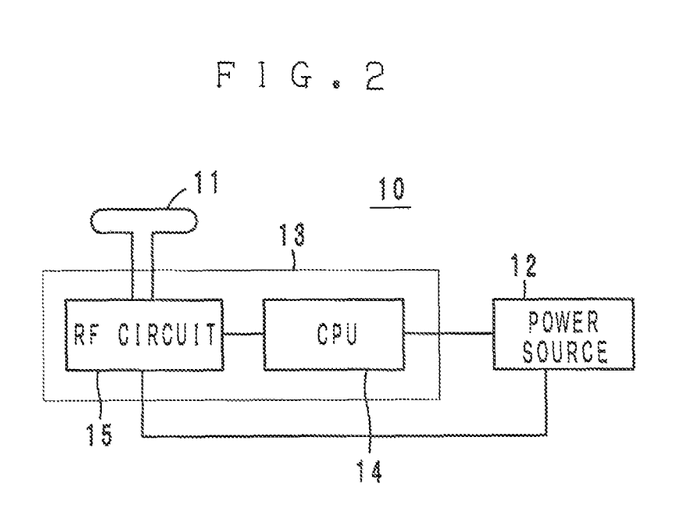
FIG. 2 is a block diagram of a communication device that is a terminal device of the wireless communication system.

Each of the communication devices (terminal devices) 10, as shown by FIG. 2, includes a coupling portion 11 to be electrically coupled with the communication terminal 20, a power source (battery) 12, and a signal processing section 13. The signal processing section 13 includes a CPU 14 and an RF circuit 15 (including an amplifier). Although the configuration of the communication device (base unit) 30 is not shown, the communication device (base unit) 30 includes a signal processing section and a power source similar to those of the terminal devices 10.

The communication terminal 20 includes neither a power source nor a signal processing section. The communication terminal 20 includes a coupling portion 21 to be electrically coupled with the coupling portion 11 of each of the terminal devices 10, an antenna 22 arranged to send and receive radio waves, and a connector 23 arranged to connect the coupling portion 21 and the antenna 22 to each other. By coupling the coupling portion 21 of the communication terminal 20 to the coupling portion 11 of one of the terminal devices 10A, the communication terminal 20 receives a signal from the terminal device 10A at the coupling portion 21 and sends the signal through the antenna 22. Further/alternately, the communication terminal 20 receives a signal at the antenna 22 and sends the signal to the terminal device 10A through the coupling portion 21. The coupling between the coupling portions 11 and 21 preferably is magnetic coupling in this preferred embodiment, but the coupling may be capacitive coupling, electric-field coupling, electromagnetic coupling, or direct contact coupling. The direct contact coupling includes direct connection by contact.

In the wireless communication system 1A, only the terminal device 10 coupled with the coupling portion 21 of the communication terminal 21 is communicable with the base unit 30. The communication terminal 21 preferably is, for example, a pen type communication terminal and can be held by an operator. In order to communicate with the base unit 30, an operator couples the communication terminal 20 with an arbitrary terminal device by hand. After the completion of the communication, the operator separates the communication terminal 20 from the terminal device 10. The coupling and separation may be performed automatically, for example, using a manipulator. Although there preferably are a plurality of terminal devices 10 in this wireless communication system 1A, only the terminal device 10 that is coupled with the communication terminal 20 is communicable with the base unit 30. Thus, there is no possibility that too heavy a burden is put on the signal processing section of the base unit 30, and degradation of the quality of communication between the base unit 30 and the terminal device 10 does not occur. Also, degradation of the communication quality due to radio wave interference between the terminal devices 10 does not occur. Since the communication terminal 20 includes neither a power source nor a signal processing section, the communication terminal 20 can be manufactured at low cost.

The power source 12 of each of the terminal devices 10 may be a battery or may receive power supplied from outside, for example. Alternatively, the power source 12 may extract electric power from a signal sent from the base unit 30. There may be a plurality of communication terminals 20, and a plurality of terminal devices 10 may be concurrently communicable with the base unit 30. The transmitted signals may preferably have frequencies within, for example, the HF band or the UHF band. For example, the frequencies of the signals may preferably be within the bands used for ZigBee (registered trademark), WiFi (registered trademark), and Bluetooth (registered trademark) or within the band used for RFID.

Second Preferred Embodiment

Figure 3:
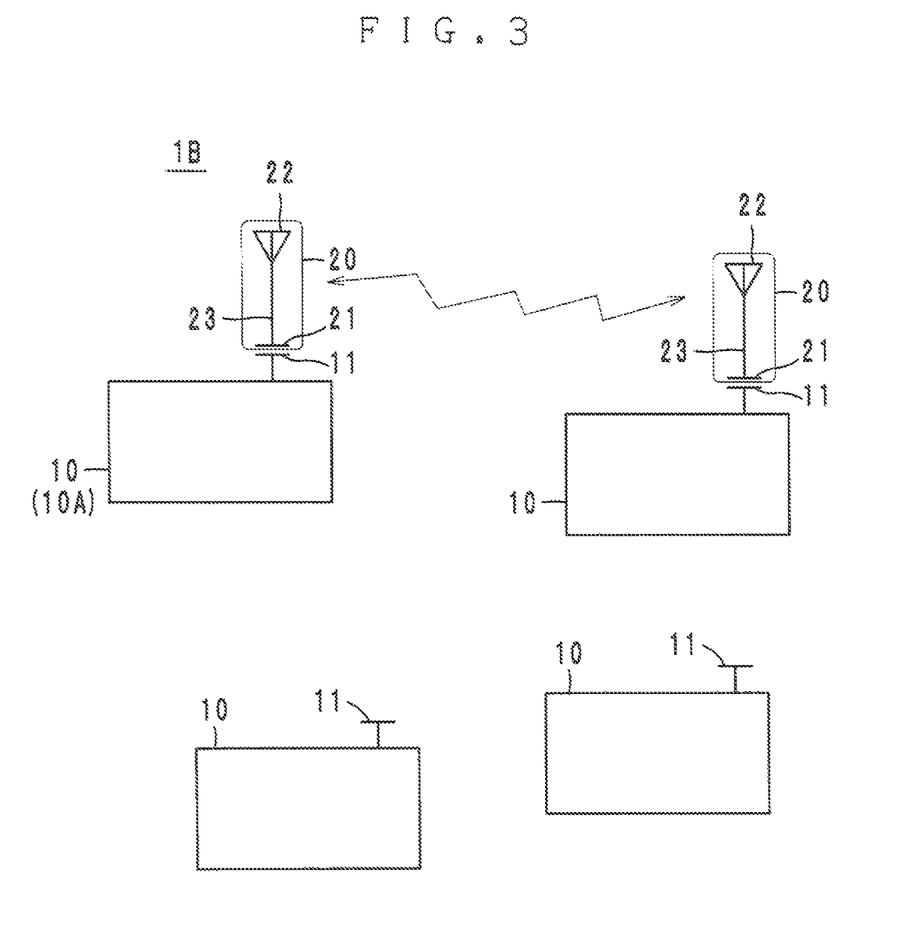
FIG. 3 is a schematic view showing a wireless communication system according to a second preferred embodiment of the present invention.

A wireless communication system 1B according to a second preferred embodiment of the present invention, as shown in FIG. 3, includes a plurality of communication devices (terminal devices) 10, and a communication terminal 20 that is a separate body from the plurality of communication devices (terminal devices) 10. In the wireless communication system 1B, all of the communication devices 10 are terminal devices, and one of the terminal devices 10A coupled with the coupling portion 21 of the communication terminal 20 functions as a base unit. Thus, each of the terminal devices 10 can function as a base unit and as a terminal device. Communication in this wireless communication system 1B can be achieved in the same or substantially the same manner as described in connection with the first preferred embodiment. The second preferred embodiment has the same or substantially the same functional effects as the first preferred embodiment. Which of the terminal devices 10 that is to be used as the base unit can be arbitrarily determined.

According to another usage example, two communication terminals 20 are coupled with two arbitrary communication devices 10, so that the two communication devices 10 become communicable with each other.

Third Preferred Embodiment

Figure 4:
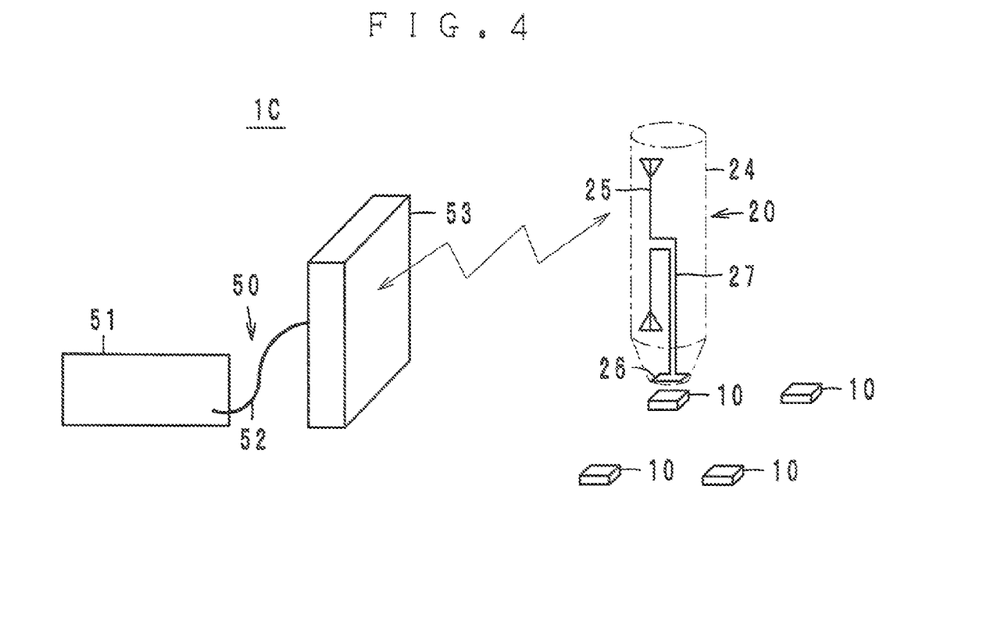
FIG. 4 is a schematic view showing a wireless communication system according to a third preferred embodiment of the present invention.

A wireless communication system 1C according to a third preferred embodiment of the present invention is applied to a sensor network system as shown in FIG. 4. The wireless communication system 1C includes a wireless communication device (base unit) 50, a plurality of communication devices (terminal devices) 10, and a communication terminal 20. The wireless communication device (base unit) 50 includes a body 51 including a signal processing circuit, and an electric-field antenna 53 connected to the body 51 by a signal line 52.

The communication terminal 20 is, for example, a pen type communication terminal that functions as a repeater. The communication terminal 20 includes a first antenna 25, a second antenna 26 (equivalent to the coupling portion 21 described above), and a connector 27 arranged to connect the first antenna 25 and the second antenna 26 to each other. These portions are encased in a cylindrical or substantially cylindrical housing 24, and the second antenna 26 is arranged in a tip portion of the housing 24. The first antenna 25 is preferably an electric-field dipole antenna, for example, and is arranged to be coupled with the antenna 53 of the wireless communication device (base unit) 50 via an electric field. The second antenna 26 is preferably a magnetic-field loop antenna, for example, and is arranged to be coupled with the coupling portion 11 of one of the communication devices 10 (see FIG. 2) via a magnetic field. The second antenna 26 is preferably a loop covering substantially the same area as each of the coupling portions 11. Each of the communication devices 10 includes a clock circuit, a logic circuit, a memory circuit, and other suitable circuit components, and stores necessary information therein.

In the wireless communication system 1C, a high-frequency wave (in the HF band, the UHF band, or a higher-frequency band, for example) radiated from the antenna 53 of the wireless communication device (base unit) 50 is received by the first antenna 25 of the communication terminal 20 and transmitted to the second antenna 26 through the connector 27. Then, when the second antenna 26 arranged at the tip portion of the housing 24 is positioned close to one of the communication devices 10, a magnetic flux in accordance with the signal of a specified frequency radiated from the second antenna 26 pierces through the coupling portion 11 of the communication terminal 10, such that an electric current flows in the coupling portion 11. In this manner, the second antenna 26 and the coupling portion 11 are electromagnetically coupled with each other. The electric current is supplied to the RF circuit 15 (see FIG. 2) of the communication device 10.

A response signal from the RF circuit 15 is transmitted to the second antenna 26 through the coupling portion 11, and the signal is fed to the first antenna 25 through the connector 27. Then, the signal is received by the antenna 53 of the wireless communication device (base unit) 50 and is read in the body 51.

Figure 5:
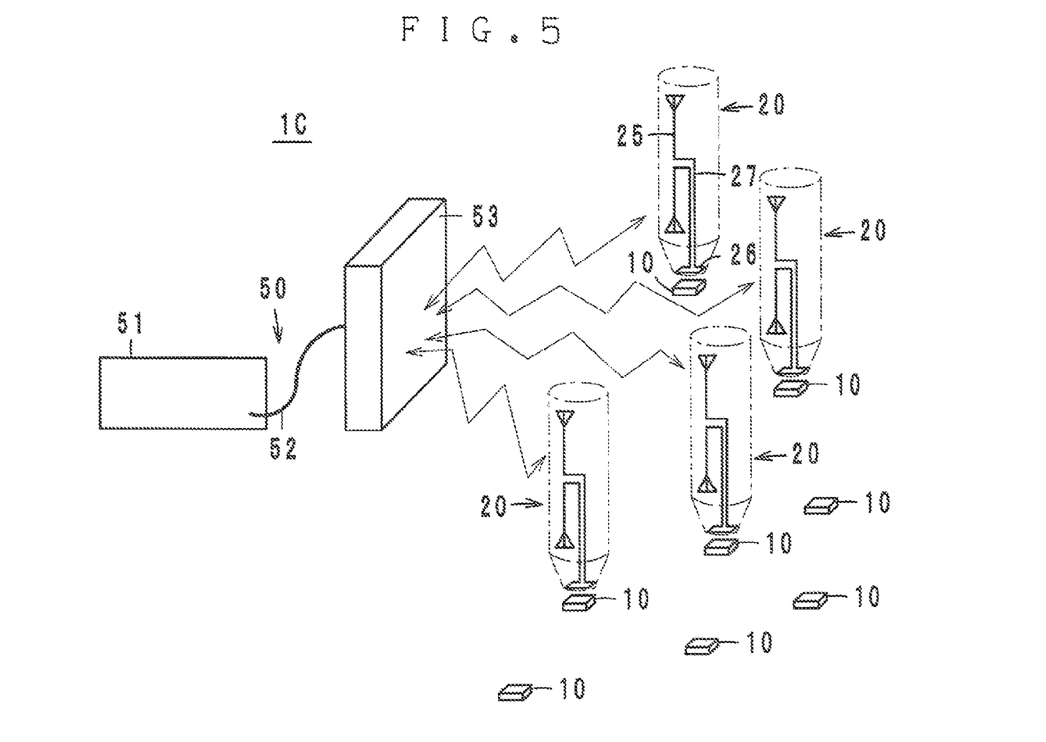
FIG. 5 is a schematic view showing another usage of the wireless communication system according to the third preferred embodiment of the present invention.

In the third preferred embodiment, the first antenna 25 and the second antenna 26 handle signals that are used in a wireless communication system, such as a sensor network system, wherein devices in compliance with ZigBee, for example, are used as terminal devices, and the communication terminal 20 functions as an intermediate between the wireless communication device (base unit) 50 and one of the communication devices 10. This enables communication between the wireless communication device (base unit) 50 and the communication device 10 even when the devices 50 and 10 are arranged too far to communicate with each other by themselves. In particular, since the antenna 53 of the wireless communication device (base unit) 50 and the first antenna 25 of the communication terminal 20 are coupled with each other via an electric field, relatively long distance communications are possible. A conventional electric-field antenna can be used as the antenna 53 of the wireless communication device (base unit) 50. Also, the coupling portion 11 of each of the terminal devices 10 and the second antenna 26 are coupled with each other by a magnetic field, and a magnetic field has greater attenuation than an electric field, which is suited for short-distance communications. Therefore, it is ensured that the second antenna 26 receives information from a specified communication device 10 even when a plurality of communication devices 10 are provided. Further, since the communication terminal 20 and the wireless communication device (base unit) 50 are coupled with each other by radio waves, it is possible to read information from a plurality of communication devices 10 concurrently by using a plurality of communication terminals 20 (see FIG. 5).

Since the first antenna 25 and the second antenna 26 are preferably connected to each other by direct contact through the connector 27, efficient signal transmission is enabled. However, the connection between the antennas 25 and 26 may be achieved by wireless connection, such as electromagnetic coupling. The communication terminal 20 includes the antennas 25, 26 and the connector 27, and does not require a driving power source, such as a battery, and its peripheral circuits. Therefore, the communication terminal 20 can be manufactured as a small device and can be manufactured at low cost. Additionally, since the second antenna 26 is arranged at the tip portion of the housing 24, coupling between the second antenna 26 and one of the communication devices 10 is readily achieved.

When an operator holds the communication terminal 20, which is, for example, of a pen type communication terminal, in his/her hand, the operator's body may function as an antenna to be coupled with an electric field. Therefore, arranging the first antenna 25 in the handle of the communication terminal 20 permits a human body to function as an antenna, so as to result in an improvement in the sensitivity of the first antenna 25.

Figure 6:
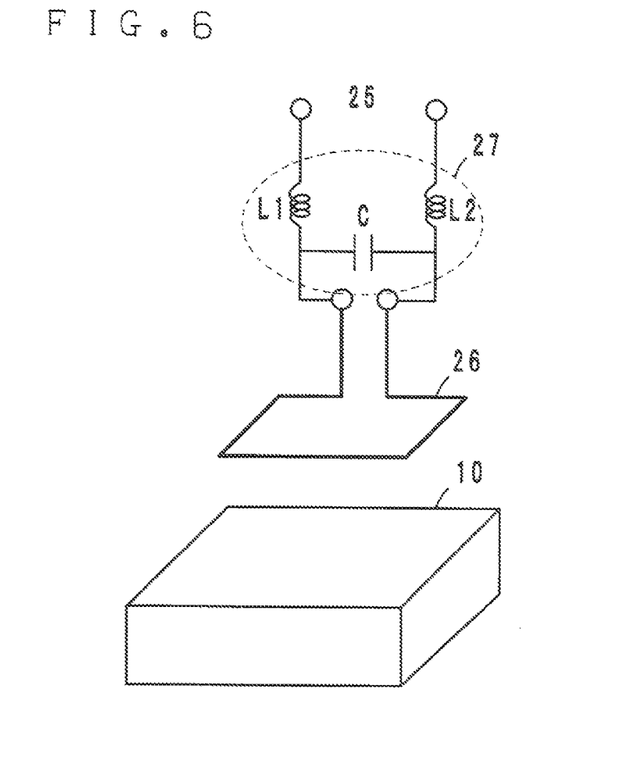
FIG. 6 is an equivalent circuit diagram showing the details of a terminal device.

As shown by FIG. 6, a matching circuit, which includes inductances L1 and L2 and a capacitance C, may preferably be provided in the connector 27 (i.e., between the second antenna 26 and the first antenna 25). The matching circuit enables impedance matching at the transmission frequency, and the efficiency of energy transfer between the first antenna 25 and the second antenna 26 is improved. This enables long-distance communication even with very little electric power. The matching circuit may have the circuit configuration shown by FIG. 6, but alternatively, may have any other suitable circuit configuration.

Figure 7:
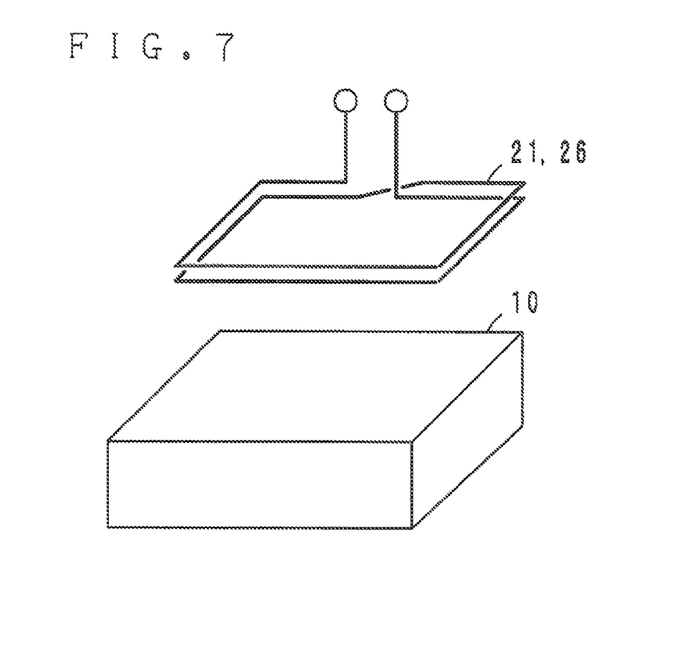
FIG. 7 is a perspective view showing a modified coupling portion of the terminal device.

The coupling portion 21 (antenna 26) of the communication terminal 20 may preferably be a loops including approximately two turns as shown by FIG. 7. With this arrangement, the magnetic flux density is increased, and the communication performance is improved.

Figure 8A:
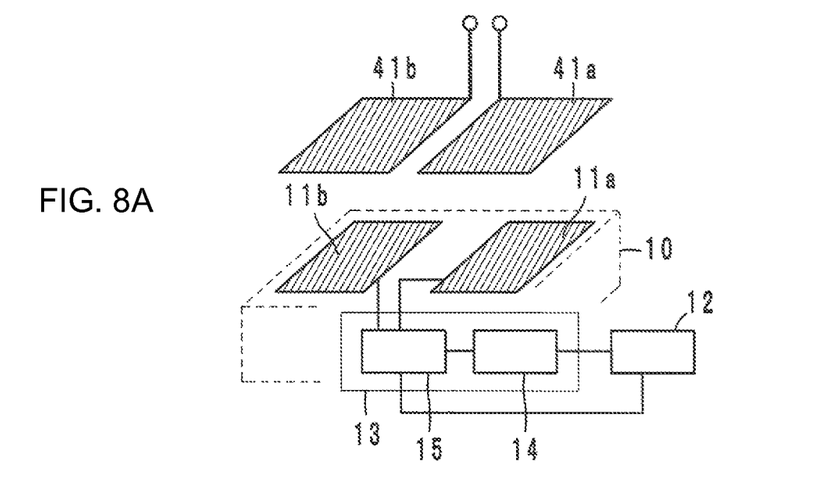
FIGS. 8A, 8B, and 8C are perspective views showing other modified coupling portions of the terminal device.

The coupling portion 21 (antenna 26) may not necessarily be arranged in a loop. The coupling portion 21 (antenna 26) may alternatively include two planar portions 41a and 41b as shown by FIG. 8A and function as a capacitive-coupled antenna or an electric-field antenna. In this example, it is preferable that the coupling portion 11 of each of the communication devices 10 include two planar portions 11a and 11b.

Figure 8B:
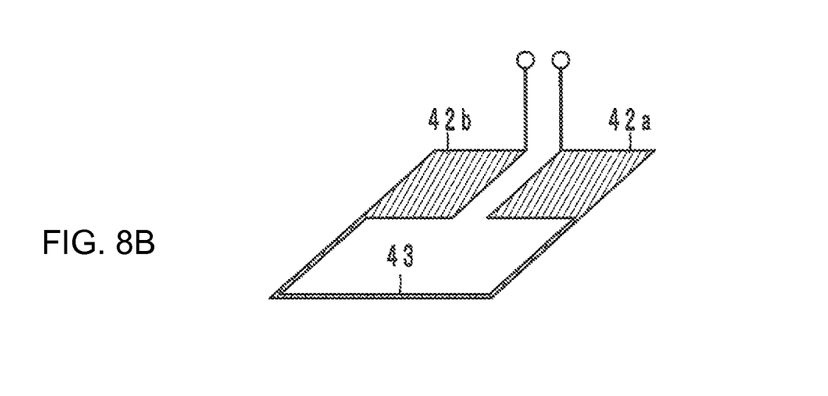
Figure 8C:
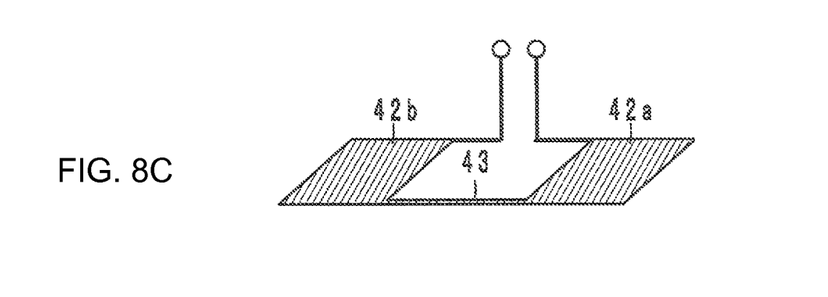

As shown by FIGS. 8B and 8C, the coupling portion 21 (antenna 26) may preferably include two planar portion 42a and 42b and further include a line 43 connecting the planar portion 42a and 42b to each other.

The wireless communication systems according to the present invention are not limited to the preferred embodiments described above, and various changes and modifications within the scope of the present invention are possible.

As described above, preferred embodiments of the present invention are applicable to wireless communication systems, and preferred embodiments of the present invention are particularly advantageous in that communication between a base unit and each of a plurality of terminal devices can be ensured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication system comprising:
 a plurality of communication devices; and
 a hand-held communication terminal that is a separate structure from the plurality of communication devices; wherein
 each of the plurality of communication devices includes a coupling portion arranged to be electrically coupled with the hand-held communication terminal, a power source, and a signal processing section arranged to process a signal received and a signal to be sent;
 the hand-held communication terminal includes a coupling portion arranged to be electrically coupled with the coupling portion of each of the plurality of communication devices, an antenna arranged to send and receive radio waves, and a connector arranged to connect the coupling portion and the antenna to each other, the hand-held communication terminal including neither a power source nor a signal processing section; and when the coupling portion of the hand-held communication terminal is coupled with the coupling portion of a specified one of the plurality of communication devices, the hand-held communication terminal receives a signal only from the specified one of the plurality of communication devices at the coupling portion thereof and sends the signal through the antenna, and/or receives a signal at the antenna and sends the signal only to the specified one of the plurality of communication devices through the coupling portion thereof.

2. A wireless communication system according to claim 1, wherein the coupling portion of the hand-held communication terminal is arranged to be coupled with the coupling portion of each of the plurality of communication devices by at least one of magnetic coupling, capacitive coupling, electric-field coupling, electromagnetic coupling, or direct contact coupling.

3. A wireless communication system according to claim 1, wherein the coupling portion of the hand-held communication terminal includes a matching circuit.

4. A wireless communication system according to claim 1, wherein
the plurality of communication devices are terminal devices; and
the wireless communication system further includes a base unit that includes a single antenna and that is communicable with one of the plurality of communication devices of which the coupling portion is coupled with the coupling portion of the hand-held communication terminal through the antenna.

5. A wireless communication system according to claim 1, wherein
at least two of the hand-held communication terminals are provided; and
at least two of the plurality of communication devices of which the coupling portions couple with the coupling portions of the at least two hand-held communication terminals are communicable with each other.

6. A wireless communication system according to claim 1, wherein the signal processing section of each of the plurality of communication devices includes a central processing unit and an RF circuit.

7. A wireless communication system according to claim 1, wherein the coupling of the coupling portion of the hand-held communication terminal with the coupling portion of a specified one of the plurality of communication devices is magnetic coupling.

8. A wireless communication system according to claim 1, wherein the hand-held communication terminal is a pen-shaped communication terminal to be held by an operator.

9. A wireless communication system according to claim 1, wherein the power source of each of the plurality of communication devices includes a battery.

10. A wireless communication system according to claim 1, wherein the signal has a frequency in one of the HF band or the UHF band.

11. A wireless communication system according to claim 4, wherein the base unit includes a body including a signal processing circuit, and the antenna is connected to the body by a signal line.

12. A wireless communication system according to claim 4, wherein the antenna is an electric-field antenna.

13. A wireless communication system according to claim 1, wherein the hand-held communication terminal includes a cylindrical or substantially cylindrical housing in which the coupling portion and the antenna of the communication terminal are disposed.

14. A wireless communication system according to claim 1, wherein the antenna of the hand-held communication terminal is an electric-field dipole antenna.

15. A wireless communication system according to claim 1, wherein each of the plurality of communication devices includes a clock circuit, a logic circuit, and a memory circuit in which necessary information is stored.

16. A wireless communication system according to claim 3, wherein the matching circuit includes at least one inductance and at least one capacitance.

17. A wireless communication system according to claim 1, wherein the coupling portion of the hand-held communication terminal has a loop shape.

18. A wireless communication system according to claim 17, wherein 17, wherein the coupling portion of the hand-held communication terminal includes approximately two turns.

19. A wireless communication system according to claim 1, wherein the coupling portion of the hand-held communication terminal includes two planar portions arranged to function as a capacitively-coupled antenna or an electric-field antenna.

20. A wireless communication system according to claim 19, wherein the coupling portion of the hand-held communication terminal further includes a line connecting the two planar portions to one another.

* * * * *

UNITED STATES PATENT AND TRADEMARK OFFICE
CERTIFICATE OF CORRECTION

PATENT NO.      : 9,161,160 B2
APPLICATION NO. : 13/908139
DATED           : October 13, 2015
INVENTOR(S)     : Nobuo Ikemoto et al.

Page 1 of 1

It is certified that error appears in the above-identified patent and that said Letters Patent is hereby corrected as shown below:

The following should be added to the title page, item 30 of the Patent:

Foreign Application Priority Data

Feb. 4, 2011 (JP)…………..2011-022668

Signed and Sealed this
Fifth Day of April, 2016

Michelle K. Lee
*Director of the United States Patent and Trademark Office*